US005223328A

United States Patent [19]

Ito et al.

[11] Patent Number: 5,223,328

[45] Date of Patent: Jun. 29, 1993

[54] THERMAL INK TRANSFER PRINTING MATERIAL

[75] Inventors: Yoshihiko Ito; Naohiro Takeda, both of Yokohama, Japan

[73] Assignee: Diafoil Hoechst Co., Ltd., Tokyo, Japan

[21] Appl. No.: 808,416

[22] Filed: Dec. 16, 1991

[30] Foreign Application Priority Data

Dec. 21, 1990 [JP] Japan ................................ 2-405216
Dec. 27, 1990 [JP] Japan ................................ 2-407798

[51] Int. Cl.$^5$ ................................ B32B 9/00

[52] U.S. Cl. ................................ 428/195; 428/323; 428/424.4; 428/480; 428/483; 428/913; 428/914

[58] Field of Search .............. 428/195, 480, 483, 913, 428/914, 323, 424.4; 503/227

[56] References Cited

U.S. PATENT DOCUMENTS 4,895,830 1/1990 Takeda et al. .................... 428/195

FOREIGN PATENT DOCUMENTS 0389153 9/1990 European Pat. Off. .
91121729 3/1992 European Pat. Off. .
59-194893 11/1984 Japan .
60-015193 1/1985 Japan .
61-279589 12/1986 Japan .
1-097679 4/1989 Japan .

*Primary Examiner*—Patrick J. Ryan
*Assistant Examiner*—W. Krynski
*Attorney, Agent, or Firm*—David G. Conlin; George W. Neuner

[57] ABSTRACT

A thermal ink transfer printing material having a specific coating layer on one surface of the base polyester film is described. By providing the specific coating layer, sticking to a thermal head of a printer can be prevented in the thermal ink transfer printing material according to the present invention, and it shows good printing properties.

7 Claims, No Drawings

THERMAL INK TRANSFER PRINTING MATERIAL

BACKGROUND OF THE INVENTION

The present invention relates to a thermal ink transfer printing material and, more particularly, to a thermal ink transfer printing material having a heat-melting or heat-sublimating transferring ink layer on one surface thereof and an anti-sticking layer on the other surface thereof.

With the recently increasing demand for information, various kinds of recording system have been developed and put to practical use. Above all, a thermal ink transfer printing system has become widespread since it has various advantages that the printing operation produces little noise, the apparatus is comparatively cheap and it has a light weight and excellent in operability and maintenance property, printing is possible on ordinary paper, and the printed record withstands a long-time storage.

In this system, a thermal ink transfer printing material comprising a base film provided with a heat-melting or heat-sublimating ink layer on one surface thereof is conventionally used. As the base film of a conventional thermal ink transfer printing material, a plastic film such as polyester film, polypropylene film, polyimide film and aromatic polyamide film, and condenser paper each having a thickness of 2 to 20 μm is used. Among these, a polyester film is generally used because it is excellent in thickness uniformity surface smoothness and the operability in a printer, and it is comparatively cheap.

A thermal ink transfer printing material using a polyester film as the base film, however, sometimes produces what is called a sticking phenomenon. In other words, the surface temperature of a thermal head rises above the melting point of the base film during printing, and the film which comes into contact with the thermal head is fused to the thermal head, thereby hindering the feeding of the thermal ink transfer printing material. The solution of this problem has become very important due to the increase in the energy applied to the thermal head with the recent development of high-speed printing and high-density printing, and due to multi-color printing.

As a solution to this problem, a method is proposed of providing a thermoplastic resin layer or a thermosetting resin layer as an anti-sticking layer, which contains a lubricant such as a surfactant and silicone oil, on the surface of the base film which comes into contact with a thermal head. Formation of such an anti-sticking layer, however, produces other problems. For example, the lubricant bleeds out to the surface of the anti-sticking layer and, as a result, dust adheres to the surface of the film, which leads to the contamination of the thermal head or misprint, or when the thermal ink transfer printing material is rolled up, the lubricant transfers to the other side of the base film and lowers the adhesion between the base film and the transfer ink layer or the adhesion between the recording paper and the transfer ink. In addition, the adhesion between the base film and the anti-sticking layer is insufficient,and the anti-sticking layer is sometimes peeled off, which leads to the contamination of the thermal head or misprint.

SUMMARY OF THE INVENTION

As a result of studies undertaken by the present inventors so as to eliminate the above-described problems in the prior art, it has been found that by forming a specific coating layer on a base film clear printing can be obtained without causing any of the wear and the contamination of a thermal head, the adhesion defect between a transfer ink and the base film or the recording paper and a sticking. On the basis of this finding, the present invention has been accomplished.

Accordingly, the present invention relates to a thermal ink transfer printing material comprising a biaxially oriented polyester film, a coating layer on one surface of the polyester film and a heat-melting or heat-sublimating transfer ink layer on the other surface of the polyester film. The thermal ink transfer printing material is produced by applying an aqueous coating liquid containing a water-soluble or water-dispersible polyolefin and a hydrophilic polymer to one surface of a polyester film, stretching and drying the film to obtain the biaxially oriented polyester film having the coating layer on one surface thereof, and then providing the heat-melting or heatsublimating transfer ink layer on the other surface of the biaxially oriented polyester film.

DETAILED DESCRIPTION OF THE INVENTION

As the polyester used in the present invention, polyethylene terephthalate in which not less than 80 mol % of the constitutional repeating units is ethylene terephthalate unit, poly-1,4-cyclohexanedimethylene terephthalate in which not less than 80 mol % of the constitutional repeating units is 1,4-cyclohexanedimethylene terephthalate unit or polyethylene-2,6-naphthalate in which not less than 80 mol % of the constitutional repeating units is ethylene-2,6-naphthalate is preferable. Diol component such as ethylene glycol, diethylene glycol, propylene glycol, neopentyl glycol, 1,4-butylene glycol, 1,4-cyclohexane dimethanol and polyalkylene glycol, dicarboxylic acid component such as terephthalic acid, isophthalic acid, adipic acid, naphthalene-2,6-dicarboxylic acid and ester-forming derivatives thereof, and hydroxycarboxylic acid component such as hydroxybenzoic acid and ester-forming derivatives thereof are usable as the copolymerizing component. The polyester used in the present invention is preferred to have an intrinsic viscosity of not less than 0.45. The upper limit of the intrinsic viscosity is not specifically defined, and practically not higher than 1.00 in view of the production cost and film-forming property.

The polyester film may contain inorganic particles, organic particles, organic lubricant, antistatic agent, stabilizer, dye, pigment and organic polymer, if necessary. Especially, in order to control the gloss of a transferred image or improve the running property at the time of manufacturing the thermal ink transfer printing material or during printing, it is sometimes preferable that the polyester film contains inorganic or organic particles as occasion demands so as to provide the surface of the polyester film with roughness.

The thickness of a polyester film to be used for manufacturing the thermal ink transfer material may be appropriately selected so as to obtain appropriate strength, heat conductivity and operability at the time of manufacturing the thermal ink transfer material.

The polyester film mentioned above is applied with an aqueous coating liquid containing a water-soluble or water-dispersible polyolefin and a hydrophilic polymer to one side thereof and then subjected to stretching and drying.

The water-soluble or water-dispersible polyolefin used in the present invention may include those having the following main skeleton:

(i) a wax, a resin, or a rubber material comprising a homopolymer or a copolymer of a 1-olefin unsaturated hydrocarbon such as ethylene, propylene, 1-butene and 4-methyl-1-pentene, for example, polyethylene, polypropylene, poly-1-butene, poly-4-methyl-1-pentene, ethylene-propylene copolymer, ethylene-1-butene copolymer and propylene-1-butene copolymer, (ii) a rubber-like copolymer of at least two of the above-described 1-olefins and a conjugated or non-conjugated diene, for example, ethylene-propylene-butadiene copolymer, ethylene-propylene-dicyclopentadiene copolymer, ethylene-propylene-ethylidenenorbornene copolymer and ethylene-propylene-1,5-hexadiene copolymer, (iii) a copolymer of a 1-olefin mentioned above and a conjugated or non-conjugated diene, for example, an ethylene-butadiene copolymer, ethylene-ethylidenenorbornene copolymer and isobutene-isoprene copolymer, (iv) a copolymer of a 1-olefin mentioned above, especially ethylene, and vinyl acetate or a completely or partially saponified product thereof, or (v) a graft copolymer obtained by grafting a conjugated or non-conjugated diene or vinyl acetate into a homopolymer or copolymer of the 1-olefins described above, or a completely or partially saponified product of the graft copolymer. The water-soluble or water-dispersible polyolefin described above is available or is used as a solution or dispersion in water.

In order to dissolve or disperse the polyolefin and stabilize it so as to prevent agglomeration, it is possible to use a known surfactant. A method of making a hydrophilic polymer such as a water-soluble polyester coexistent with the dispersion is also effective. The dissolution or dispersion of the polyolefin in water may be facilitated by introducing a vinyl compound having a hydrophilic group such as a carboxylic group, a sulfonic acid group, amino group, polyether group, alkylolamido group and a salt thereof into the polyolefin skeleton by copolymerization and graft copolymerization.

The particularly preferable water-soluble or water-dispersible polyolefin is a soapless or self-emulsifiable polyolefin obtained by introducing a vinyl compound having the above-described hydrophilic group to the polyolefin skeleton, which can be dispersed or dissolved in water without the aid of a surfactant or another hydrophilic polymer.

The water-soluble or water-dispersible polyolefin is preferred to have a molecular weight of 1,000 to 6,000, a melting point of not higher than 160° C. and a melt viscosity of not more than 10,000 cps, because such water-soluble or water-dispersible polyolefin can provide a good slipping property which prevents sticking at a high temperature. As these polyolefins, commercially available products by Toho Kagaku Kogyo K. K., Mitsui Sekiyu Kagaku Kogyo K. K., Seitetsu Kagaku Kogyo K. K. and ROHM AND HAAS Co. can be used but they are not limited to these products.

By forming a coating layer containing the above-described polyolefin, it is possible to impart a good slipping property to the thermal ink transfer printing material and to prevent a sticking phenomenon. Since the above-described polyolefins generally become solid after they are dried, when the thermal ink transfer printing material is rolled up, the amount of the polyolefin transferred to the other side of the base film is smaller than a conventional liquid lubricant. Even when the polyolefin is transferred to the other side of the base film, the coating property of a transfer ink to the base film, the adhesion between the base film and the transfer ink layer or the adhesion between the recording paper and the transfer ink is not impaired.

Since a thermal ink transfer printing material is generally an electric insulator and the surface resistivity thereof is as high as not less than $10^{14}$ Ω/cm, the thermal ink transfer printing material is electrostatically charged by the contact thereof with the thermal head, guide pins, support bars or recording paper when the thermal ink transfer printing material is fed in the printer, when it is rolled up or while printing is carried out. Due to the electrostatic charge, dust adheres to the surface of the thermal ink transfer printing material, which leads to the contamination of the thermal head or misprint. The electrostatic charge also damages the thermal head or causes sagging or wrinkles of the thermal ink transfer printing material, thereby lowering the running property thereof. Furthermore, when the thermal ink transfer printing material is replaced with a new one, the electrostatic charge imparts an electric shock to the human body. In addition, the electrostatic charge exerts a disadvantageous electrical influence on the electronic control parts of a printer and may cause a malfunction or defective operation.

These problems can be solved by the combined use of a water-dispersible carbon black together with the water-soluble or water-dispersible polyolefin. Such a carbon black is required to have water dispersibility, stability to other ingredients in a coating liquid, uniform dispersibility in the binder after the formation of the coating layer (antisticking layer), antistatic property, etc. It is possible to appropriately control these properties by selecting appropriate raw material, manufacturing method, particle diameter, specific surface area and chemical surface structure of the carbon black, an appropriate method of dispersing the carbon black in an aqueous medium and the like. For example, in the case where only the antistatic property is important, what is called a conductive carbon black having special chemical surface structure, porosity, and aggregate structure is used. A water dispersion of the conductive carbon black is apt to have a high viscosity due to its properties, therefore, in the case where the water dispersibility is also important, it is sometimes preferable to use a carbon black having a small specific surface area or low oil absorption although such carbon black is slightly low in the antistatic property.

The average particle diameter of the carbon black used in the present invention is ordinarily in the range of 0.01 to 0.20 μm. If the average particle diameter is less than 0.01 μm, the viscosity of the coating liquid sometimes increases while it depends upon the concentration of the carbon black and the type of the dispersant, and the handling property and the coating property of the coating liquid are deteriorated due to its rheological property. On the other hand, if the average particle diameter exceeds 0.20 μm, the carbon black is apt to agglomerate, thereby producing coarse protuberances on the anti-sticking layer, which may be dropped off during the running of a thermal ink transfer printing material in a printer and contaminate the thermal head or lower the antistatic property.

The specific surface area of the carbon black is preferably from 30 to 1000 $m^2/g$ (value by BET method)

and the oil absorption of the carbon black is preferably from 40 to 400 ml/100g.

The above-described polyolefin and optional carbon black are mixed with a water-soluble or water-dispersible hydrophilic polymer to produce a coating liquid which forms the anti-sticking layer.

The water-soluble or water-dispersible hydrophilic polymer, which is used as a hydrophilic binder, is not specified. As examples of such a hyrophilic polymer, the hydrophilic polymers which are described in "Collection of Data on Water-Soluble Polymers and Water-Dispersible Resins", edited by the publishing department of Keiei Kaihatsu Center, published Jan. 23, 1981 may be cited. They are hydrophilic polymers which are soluble, emulsifiable or dispersible in water, for example, cellulose derivatives such as starch, methyl cellulose and hydroxy ethyl cellulose, alginic acid, gum arabic, gelatin, sodium polyacrylate, polyacrylamide, polyvinyl alcohol, polyethylene oxide, polyvinylpyrrolidone, urethane resins, acrylic resins, ether resins, epoxy resins and ester resins.

Among these, hydrophilic polymers having a good adhesion with a polyester film are especially preferable. They are, for example, urethane resins, acrylic resins, epoxy resins, polyester resins, polyvinylpyrrolidone, and copolymers thereof. The preferred hydrophilic polymers are not restricted to the above examples. These compounds may be used either singly or in the form of a mixture.

As the urethane resin, a hydrophilic urethane resin comprising polyisocyanate, polyol, a chain-lengthening agent, a cross-linking agent, etc. as the main constituents is usable. Such hydrophilic urethane resin is usually produced by using polyisocyanate, polyol or a chain-lengthening agent having a hydrophilic group, or by reacting the non-reacted isocyanate group of polyurethane with a compound having a hydrophilic group. A modified urethane resin by graft or block polymerization with a compound having polysiloxane group, fluorinated alkyl group, epoxy group or the like may be used as the hydrophilic urethane resin.

As the acrylic resin, an hydrophilic acrylic resin may be used which is obtained by copolymerizing, as the main components, a vinyl monomer having a reactive functional group such as carboxyl group or a salt thereof, acid anhydride group, sulfonic acid group or a salt thereof, amide group, amino group, hydroxyl group and epoxy group with an alkyl acrylate and/or alkyl methacrylate. From the point of view of the adhesion with a polyester film and the strength of the coating layer to be produced therefrom, an hydrophilic acrylic resin having carboxyl group, amino group, hydroxyl group or epoxy group is preferable. It is also possible to use a modified acrylic resin by graft or block polymerizing a compound having a polysiloxane group, fluorinated alkyl group, epoxy group or the like as the hydrophilic acrylic resin.

As the dicarboxylic component of the polyester resin as the hydrophilic polymer, an aromatic dicarboxylic acid such as terephthalic acid, isophthalic acid and 2,5-naphthalenedicarboxylic acid, an aliphatic dicarboxylic acid such as adipic acid, azelaic acid and sebacic acid, an hydroxycarboxylic acid such as hydroxybenzoic acid and ester-forming derivatives thereof are usable. As the glycol component of the polyester resin as the hydrophilic polymer, an aliphatic glycol such as ethylene glycol, 1,4-butanediol, diethylene glycol and triethylene glycol, an alicyclic glycol such as 1,4-cyclohexane dimethanol, an aromatic diol such as p-xylene diol, and a poly(oxyalkylene) glycol such as polyethylene glycol, polypropylene glycol and polytetramethylene glycol may be mentioned. The polyester resin as the hydrophilic polymer may include a saturated linear polyester comprising the above-described ester-forming components. Such a polyester may further contain a compound having three or more ester-forming groups or a compound having a reactive unsaturated group as the component constituting the polyester. The polyester resin as the hydrophilic polymer preferably has sulfonic acid group, carboxylic acid group or a salt thereof in order to improve the solubility or dispersibility to water. A modified polyester obtained by graft polymerizing a vinyl compound having a polysiloxane group, fluorinated alkyl group, epoxy group, amide group or the like may be also used as the hydrophilic polymer.

As the polyvinylpyrrolidone, a homopolymer and a copolymer with a vinyl monomer such as styrene may be used.

The ratio of the water-soluble or water-dispersible polyolefin in the coating layer (anti-stacking layer) of the thermal ink transfer printing material of the present invention is preferably in the range of 5 to 40 wt % based on the total amount of the coating layer. If the ratio of the water-soluble or water-dispersible polyolefin is less than 5 wt %, the slipping property is insufficient for preventing a sticking phenomenon. On the other hand, if it exceeds 40 wt %, the toughness of the coating layer is unfavorably lowered and the thermal head is sometimes contaminated, thereby making it impossible to obtain clear printing.

The ratio of the hydrophilic polymer in the coating layer is preferably from 10 to 95 wt % based on the amount of the coating layer.

In the case of using the optional water-dispersible carbon black, the mixing ratio thereof is preferably in the range of 10 to 50 wt % based on the total amount of the coating layer. If the ratio is less than 10 wt %, the antistatic property is sometimes insufficient although it depends upon the thickness of the coating layer and the dispersibility of the carbon black. On the other hand, if it exceeds 50 wt %, the viscosity of the coating liquid increases so much that the handling property and the coating property are deteriorated and a cracking of the coating layer is apt to occur during the coating-stretching process. The cracking produces coarse protuberances such as long and narrow protuberances on the surface of the coating layer. Such a discontinuous coating layer makes the antistatic property insufficient. In addition, the coating layer is easily separated from the base film or sometimes contaminates the thermal head during printing.

In the present invention, it is preferable that the coating layer contains a cross-linking agent. By forming cross-linked structures in the coating layer, the coating layer can be made into a heat-resistant layer which is not softened when heated by a thermal head, and its anti-stacking effect can be further improved. At the same time, the solvent resistance, water resistance, adhesion, mechanical strength and the like of the coating layer are also improved. Examples of the cross-linking agent used are methylol or alkylol ureas, melamines, guanamines, acrylamides and polyamides, epoxy compounds, aziridine compounds, polyisocyanates, block polyisocyanates, silane coupling agents, titanium coupling agents, zirco-aluminate coupling agents, thermal-, hydroperxide- or light-reactive vinyl compounds and photosensitive resins. The cross-linking agent may be contained in the coating layer in a ratio from 5 to 50 wt % based on the amount of the coating layer.

The coating layer of the thermal ink transfer printing material of the present invention may further contain organic polymer particles or inorganic polymer particles in addition to carbon black in order to improve the adhesion and the slipping property. Furthermore, the coating layer may contain defoamer, coating property modifier, thickening agent, organic lubricant, antioxidant, ultraviolet light absorber, foaming agent, dye and pigment, if necessary.

The coating liquid for forming the coating layer is prepared by dissolving and/or dispersing the water-soluble or water-dispersible polyolefin, the hydrophilic polymer, the optional carbon black and the optional cross-linking agent in water in the presence or absence of a surfactant. The water-soluble or water-dispersible polyolefin and the hydrophilic polymer in the form of aqueous solution or aqueous dispersion may also be used. The total solid content (the water-soluble or water-dispersible polyolefin, the hydrophilic polymer, the optional carbon black, the optional cross-linking agent and the optional surfactant) in the coating liquid is preferred to be from 1 to 50 wt % based on the amount of the coating liquid.

As methods of applying the above-described coating liquid on one surface of the polyester base film, may be employed the methods described in "Coating method" by Yuzo Harasaki, published by Maki Shoten, 1979, in which a coating liquid is applied on a film by means of a reverse roll coater, gravure coater, rod coater, air doctor coater or another applicator.

In the present invention, the coating liquid is applied on a non-stretched polyester film by the above method and the thus applied film is then subjected to successive or simultaneous biaxial stretching to obtain a biaxially stretched polyester film having a coating layer on one surface thereof. In another method,the coating liquid is applied on a monoaxially stretched polyester film and the thus applied film is stretched in the direction orthogonal to the stretching direction of the monoaxially stretched polyester film to obtain a biaxially stretched polyester film having a coating layer on one surface thereof. In still another method, the coating liquid is applied on a biaxially stretched polyester film and the thus applied film is stretched in machine and/or transverse directions to obtain a biaxially stretched polyester film having a coating layer on one surface thereof.

The stretching process is preferably carried out at 60° to 180° C., and the stretch ratio is ordinarily at least 4, preferably 6 to 20 by areal stretch ratio. The stretched film is ordinarily heat-treated at 150° to 260° C. It is also preferable to relax the stretched film by 0.1 to 30% in the machine and transverse directions in the maximum temperature zone of heat treatment and/or the cooling zone at the exit of heat treatment.

An especially preferable method is a method of applying the coating liquid on a stretched polyester film which is monoaxially roll-stretched to 2 to 6 times at 60° to 180° C. in the machine or transverse direction, stretching the thus obtained applied film in the direction orthogonal to the stretching direction of the monoaxially stretched film to 2 to 6 times at 80° to 180° C. after or without drying, and then heat-treating the biaxially stretched film at 150° to 260° C. for 1 to 600 seconds.

According to the methods described above, it is possible to dry the coating layer simultaneously with the stretching of the base film and to make the thickness of the coating layer thiner in accordance with the stretch ratio of the film. It is also easier to treat the film at a higher temperature in comparison with an ordinary method of applying a coating liquid to a biaxially stretched film, and as a result, it is possible to form a strong coating layer having an excellent heat resistance without causing the lowering of the flatness or the heat shrinkage of the base film.

In these methods, it is also preferable that the base polyester film is subjected to chemical treatment or discharging treatment before the coating liquid is applied thereto in order to improve the coating property and the adhesion between the coating layer and the base film.

The thickness of the coating layer of the thermal ink transfer material of the present invention is preferably 0.01 to 3 μm, more preferably 0.02 to 1 μm, and the thickness of the biaxially stretched base film is preferably 1 to 20 μm, more preferably 1 to 15 μm. If the thickness of the coating layer is less than 0.01 μm, since it is difficult to apply the coating liquid uniformly, the coating layer is likely to become uneven in its thickness. On the other hand, if the thickness of the coating layer is more than 3 μm, the adhesion between the coating layer and the base film and the slipping property of the coating layer are sometimes lowered.

The thermal ink transfer printing material of the present invention is obtained by forming the heat-melting or heat-sublimating transfer ink layer comprising a coloring agent and a binder on the other surface of the biaxially stretched polyester film having the coating layer. The coloring agent and the binder are not specified and known coloring agent and binder are appropriately used.

The coloring agent for the heat-melting transfer ink may include an organic or inorganic pigment such as carbon black and phthalocyanine pigment, basic dye, oil-soluble dye, acidic dye, direct dye, disperse dye, etc. As the binder, a mixture of a wax as the main ingredient and another wax, drying oil, mineral oil, cellulose, a rubber derivative or the like may be mentioned. As the wax, various waxes such as microcrystalline wax, carnauba wax, paraffin wax, Fischer-Tropsh wax, Japan wax, beeswax, candelilla wax, petrolatum, modified wax, fatty acid ester and fatty acid amide are usable. In order to impart a good heat conductivity and heat-melting transferring property to the heat-melting ink layer, a good heat-conductive substance may be mixed to the ink. As the good heat-conductive substance, fine powders of carbon materials such as carbon black, metals such as aluminum and copper, oxides such as tin oxide and aluminum oxide, nitrides such as titanium nitride and the like are usable.

The coloring agent for the heat-sublimating transfer ink may include sublimating dyes such as azo dye and anthraquinone dye, and it is appropriately selected by considering heat-sublimation temperature, hue, weather resistance, stability in the binder, etc. As the binder, a binder which has a high heat resistance and which does not prevent the transfer of the dye when heated is selected. Examples of the binder are methyl cellulose, ethyl cellulose, hydroxyethyl cellulose, cellulose acetate, nitrocellulose, polyvinyl alcohol, polyvinylbutyral, polyvinylpyrrolidone, polyester and polyacrylamide.

The above-described transfer ink is applied on the base film by heat-melting coating, hot lacquer coating, gravure coating, gravure reverse coating, roll coating, microgravure coating, or other methods to obtain the thermal ink transfer printing material.

The thickness of the transfer ink layer is determined based on transfer concentration, heat sensitivity and the like. It is ordinarily 0.1 to 20 μm, preferably 1 to 15 μm.

The base film may be subjected to a discharge treatment or a chemical treatment or provided with a known primary coat having good adhesion or releasability before forming the transfer ink layer thereon in order to control the adhesion between the transfer ink layer and the base film. It is also possible to provide a known matt layer between the transfer ink layer and the base film in order to control the surface gloss of the transferred image.

The present invention will be explained hereinunder with reference to the following examples. It is to be understood that these examples are only illustrative and the present invention is not restricted thereto.

The properties of the thermal ink transfer printing material of the present invention were evaluated in the following methods.

(1) Adhesion of coating film

A 18 mm width cellophane tape (produced Nichiban Co., Ltd.) cut to a 5 cm length was applied on the anti-sticking layer in such a manner as to prevent air bubbles from being contained therein, and a constant load was applied to the anti-sticking layer by a manual 3-kg loading roll. Thereafter, the base film was fixed and the cellophane tape was peeled therefrom at the peel angle of 90°.

The adhesion was evaluated in accordance with the following ratings.

O: Less than 10% of the anti-sticking layer was peeled off with the cellophane tape.

Δ: 10 to 50% of the anti-sticking layer was peeled off with the cellophane tape.

X: More than 50% of the anti-sticking layer was peeled off with the cellophane tape.

(2) Runaway and adhesion of transfer ink layer

The coating layer was contacted with the base polyester film surface before a transfer ink layer was provided thereon, and this laminate was subjected to wet-heat press for 20 hours under the conditions of 40° C., 80% humidity and 10 kg/cm$^2$ load. Thereafter, the coating layer was separated from the base film surface, and a transfer ink composition comprising 60 parts of an aqueous dispersion of a polyester resin and 40 parts of an aqueous dispersion of carbon black and having a solid concentration of 30 wt % was applied on the polyester base film surface to a thickness of 2.5 μm. The presence or absence of runaway of the transfer ink layer was visually observed and expressed by the following ratings. The thermal ink transfer printing material was further subjected to flexing test by hands and the separation of the transfer ink layer was visually observed and expressed by the following ratings.

(i) Runaway of transfer ink layer

O: The transfer ink composition was uniformly coated without runaway.

Δ: A slight amount of runaway was observed.

X: A large amount of runaway was observed over the entire surface.

(ii) Adhesion of transfer ink layer

O: No separation.

Δ: Less than 50% of the transfer ink layer was separated.

X: More than 50% of the transfer ink layer was separated.

(3) Anti-sticking property, printing property

Printing was carried out by using a line type thermal head under the following printing conditions.

Recording density: 4 dots/mm

Recording power: 0.7 W/dot

Head heating time: 4 to 10 msec

The anti-sticking property and printing property were evaluated in accordance with the following ratings.

(i) Anti-sticking property

O: No sticking phenomenon.

Δ: The sticking phenomenon was slightly observed.

X: A remarkable sticking phenomenon and impossible to feed the transfer printing material.

(ii) Printing property

O: No mottling, blurring or unclear printing (the blurring the printed image due to transfer of the ink in the vicinity of the printing portion).

Δ: The mottling, blurring or unclear printing was slightly observed.

X: The mottling, blurring or unclear printing was remarkably observed.

(4) Surface resistivity

The surface resistivity was measured at 23° C. and 50% RH by a concentric electrode 16008A (trade mark) and a high ohm-meter 4329A (trade mark), produced by Yokokawa Hewlett-Packard Co. Ltd..

EXAMPLES 1 TO 4 AND COMPARATIVE EXAMPLES 1 TO 3

A polyethylene terephthalate (intrinsic viscosity: 0.65) containing 0.2 wt % of amorphous silica having an average particle diameter of 1.3 μm was melt extruded at 285° C. and cast onto a cooling drum of 60° C. by an electrostatic pinning method. The thus-obtained film was stretched to 3.5 times in the machine direction at 95° C. After the coating liquid having the composition shown in Table 1 was applied on one surface of the stretched film, the applied film was stretched to 4.0 times in the transverse direction at 110° C. and then heat-set at 230° C., thereby producing a film of 6 μm thick provided with an anti-sticking layer of 0.1 μm thick. The surface of the thus-obtained film opposite to the antisticking layer was coated with the heat-melting ink composition having the following composition by heat-melting coating method in an amount of 3 g/m$^2$, thereby obtaining a thermal ink transfer printing material.

| (Composition of the heat-melting ink) | |
|---|---|
| Carbon black | 20 parts by weight |
| Paraffin wax | 40 parts by weight |
| Carnauba wax | 30 parts by weight |
| Ethylene-vinyl acetate copolymer | 10 parts by weight |

In Table 1, the aqueous dispersion of polyethylene, HYTEC E-103N (trade name) produced by Toho Kagaku Kogyo K. K., has the average molecular weight of 1850, the melting point of 91° C. as measured by a differential thermal analyzer and the melt viscosity of 200 cps (at 140° C.), while the aqueous dispersion of polyethylene, HYTEC E-4B (trade name) has the average molecular weight of 4000, the melting point of 123° C. as measured by a differential thermal analyzer and the melt viscosity of 4400 cps (at 140° C.). The results of the evaluations of the properties of the thermal ink transfer printing materials obtained are collectively shown in Table 2. The thermal transfer ink printing materials of Examples 1 to 4 showed no sticking phenomenon and has an excellent running property. The transfer ink composition was uniformly coated without causing runaway and the printing property was good.

In contrast, in Comparative Examples 1 and 2, although no sticking phenomenon was observed, the coating property was poor to cause runaway of the transfer ink composition. The adhesion between the transfer ink layer and the polyester base film was also inferior, and the printing property was poor to cause unclear printing. In Comparative Example 3, runaway of the transfer ink composition occurred and a sticking phenomenon was so striking that the thermal ink transfer printing material was not able to run in a printer at all.

EXAMPLE 5

A polyethylene-2,6-naphthalate (intrinsic viscosity: 0.68) containing 0.2 wt % of amorphous silica having an average particle diameter of 1.3 μm was melt extruded at 295° C. and cast onto a cooling drum of 60° C. by an electrostatic pinning method. The thus-obtained film was stretched to 4.0 times in the machine direction at 130° C. After the same coating liquid as in Example 1 was applied to one surface of the stretched film, the applied film was stretched to 4.0 times in the transverse direction at 130° C. and then heat-set at 220° C., thereby producing a film of 4.5 μm thick provided with an anti-sticking layer of 0.1 μm thick. An isopropyl alcohol solution of ethyl cellulose with anthraquinone dye PTR-63 produced by Mitsubishi Kasei Corporation dispersed therein was applied to the other surface of the thus obtained film so that the thickness of the film after drying was 2 μm. Thus, a heat-sublimating type thermal ink transfer printing material was obtained.

The thus-obtained thermal ink transfer printing material was evaluated in the same way as in Example 1. The adhesion between the anti-sticking layer and the base polyester film was good. No runaway of the transfer ink was observed and the adhesion between the transfer ink and the base polyester film was also good. No sticking phenomenon was observed and the running property was good. No blurring was observed in the printed image and clear printed image was obtained.

TABLE 1

| | Hydrophilic polymer | | Cross-linking agent | | Polyolefin | |
|---|---|---|---|---|---|---|
| | Type | Solid content (wt %) | Type | Solid content (wt %) | Type (wt %) | Solid content |
| Example 1 | Silicon graft acrylic resin (GF-255, produced by Nippon Shokubai K.K.) | 55 | Methylated melamine resin | 30 | Aqueous dispersion of polyethylene (HYTEC E-103N, produced by Toho Kagaku Kogyo K.K.) | 15 |
| Example 2 | Silicon graft acrylic resin (GF-255, produced by Nippon Shokubai K.K.) | 60 | Methylated melamine resin | 20 | Aqueous dispersion of polyethylene (HYTEC E-103N, produced by Toho Kagaku Kogyo K.K.) | 20 |
| Example 3 | Silicon graft acrylic resin (GF-255, produced by Nippon Shokubai K.K.) | 60 | Methylated melamine resin | 20 | Aqueous dispersion of polyethylene (HYTEC E-4B, produced by Toho Kagaku Kogyo K.K.) | 20 |
| Example 4 | Urethane-acryl copolymer resin (NEOPAC XR-9000, produced by ICI Resins US) | 60 | Methylated melamine resin | 20 | Aqueous dispersion of polyethylene (HYTEC E-103N, produced by Toho Kagaku Kogyo K.K.) | 20 |
| Compar. Example 1 | Urethane-acryl copolymer resin (NEOPAC XR-9000, produced by ICI Resins US) | 65 | Methylated melamine resin | 20 | Carboxy-modified silicone oil BY22-840, produced by Toray Daw Coaning Silicone) | 15 |
| Compar. Example 2 | Silicon graft acrylic resin (GF-255, produced by Nippon Shokubai K.K.) | 60 | Methylated melamine resin | 20 | Acryl-modified silicone oil X-52-550B, produced by Khinetsu Kagaku Kogyo K.K.) | 20 |
| Compar. Example 3 | Silicon graft acrylic resin (GF-255, produced by | 65 | Methylated melamine resin | 20 | Fluorine type surfactant MEGAFAC F-116, produced by Dai- | 15 |

TABLE 1-continued

| Hydrophilic polymer | | Cross-linking agent | | Polyolefin | |
|---|---|---|---|---|---|
| Type | Solid content (wt %) | Type | Solid content (wt %) | Type (wt %) | Solid content |
| Nippon Shokubai K.K.) | | | | Nippon Ink Kagaku Kogyo K.K.) | |

TABLE 2

| | Adhesion of coating layer | Runaway of ink layer | Adhesion of ink layer | Anti-sticking property | Printing property |
|---|---|---|---|---|---|
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Comparative Example 1 | ○ | X | X | ○ | X |
| Comparative Example 2 | ○ | Δ | X | ○ | Δ |
| Comparative Example 3 | ○ | Δ | X | X | — |

EXAMPLE 6

A polyethylene terephthalate (intrinsic viscosity: 0.65) containing 0.2 wt % of amorphous silica having an average particle diameter of 1.3 μm was melt extruded at 285° C. and cast onto a cooling drum of 60° C. by an electrostatic pinning method. The thus-obtained film was stretched to 3.5 times in the machine direction at 85° C. After the coating liquid having the following composition was applied to one surface of the stretched film, the applied film was stretched to 4.0 times in the transverse direction at 110° C. and then heat-set at 230° C., thereby producing a film of 6 μm thick provided with an anti-sticking layer of 0.3 μm thick. The other surface of the base polyester film was coated with the heat-melting ink composition comprising 20 parts by weight of carbon black, 40 parts by weight of paraffin wax, 30 parts by weight of carnauba wax and 10 parts by weight of an ethylene-vinyl acetate copolymer by heat-melting coating method in an amount of 3 $g/m^2$, thereby obtaining a thermal ink transfer printing material of the present invention.

Composition of Coating Liquid

Carbon black for pigments having a specific surface area of 137 $m^2/g$, an oil absorption of 53 ml/100 g and an average primary particle diameter of 24 nm as measured through an electron microscope was dispersed in water by using a nonionic surfactant, thereby preparing a water-dispersible carbon black having an average particle diameter of 0.04 μm as measured by a centrifugal sedimentation method.

The coating liquid was prepared by mixing 15 parts (weight of the solid content, the same being applied to the following "parts") of the water-dispersible carbon black, 15 parts of an aqueous dispersion of polyethylene (HYTEC E-103N (trade name) produced by Toho Kagaku Kogyo K. K.), 50 parts of an aqueous dispersion of an urethane-acryl copolymer (NEOPAC XR-9000 (trade name) produced by ICI Resins US), 20 parts of a methylated melamine resin, and 0.3 part of a fluorine type surfactant (MEGAFAC F-116 (trade name) produced by Dai-Nippon Ink Kagaku Kogyo K. K.).

EXAMPLE 7

A thermal ink transfer printing material was produced in the same way as in Example 6 except that the mixing ratios of the ingredient of the coating liquid was changed as follows:

| (Composition of coating liquid) | |
|---|---|
| Carbon black | 30 parts |
| Aqueous dispersion of polyethylene | 10 parts |
| Aqueous dispersion of urethane-acryl copolymer | 45 parts |
| Methylated melamine resin | 15 parts |
| Fluorine type surfactant | 0.3 parts |

EXAMPLE 8

A thermal ink transfer printing material was produced in the same way as in Example 6 except that the following coating liquid was used.

| (Composition of coating liquid) | |
|---|---|
| Carbon black (used in Example 6) | 20 parts |
| Aqueous dispersion of polyethylene (NOPCOTE PEM-17 (trade name) produced by SAN NOPCO Ltd.) | 15 parts |
| Aqueous dispersion of an aliphatic polyurethane (NEOREZ R-960 produced by Polyvinyl Chemical Co. Ltd.) | 45 parts |
| Methylated melamine | 20 parts |
| Fluorine type surfactant (MEGAFAC F-116 (trade name) produced by Dai-Nippon Kagaku Kogyo K.K.) | 0.3 part |

COMPARATIVE EXAMPLE 4

A thermal ink transfer printing material was produced in the same way as in Example 6 except that the aqueous dispersion of polyethylene was not contained in the coating liquid.

COMPARATIVE EXAMPLE 5

A thermal ink transfer printing material was produced in the same way as in Example 6 except that a carboxyl-modified silicone oil BY22-840 (trade mark) produced by Toray Daw Coaning Silicone Co. Ltd. was used in place of the aqueous dispersion of polyethylene.

EXAMPLE 9

A polyethylene-2,6-naphthalate (intrinsic viscosity: 0.68) containing 0.2 wt % of amorphous silica having an average particle diameter of 1.3 μm was melt extruded at 295° C. and cast onto a cooling drum of 60° C. by an electrostatic pinning method. The thus-obtained film was stretched to 4.0 times in the machine direction at 130° C. After the same coating liquid as in Example 6 was applied to one surface of the stretched film. The applied film was stretched to 4.0 times in the transverse direction at 130° C. and then heat-set at 220° C., thereby producing a film of 4.5 μm thick provided with an anti-sticking layer of 0.3 μm thick. An isopropyl alcohol solution of ethyl cellulose with anthraquinone dye, PTR-63 produced by Mitsubishi Kasei Corporation, dispersed therein was applied to the other surface of the base film of the thus-obtained film so that the thickness of the coating after drying was 2 μm. Thus, a heat-sublimating type thermal ink transfer printing material was obtained.

The results of evaluation of the properties of the thermal ink transfer printing materials obtained are collectively shown in Table 3.

TABLE 3

| | Surface resistivity (Ω/cm) | Adhesion of coating layer | Runaway of ink layer | Adhesion of ink layer | Anti-sticking property | Printing property |
|---|---|---|---|---|---|---|
| Example 6 | $5 \times 10^8$ | ○ | ○ | ○ | ○ | ○ |
| Example 7 | $3 \times 10^6$ | ○ | ○ | ○ | ○ | ○ |
| Example 8 | $1 \times 10^9$ | ○ | ○ | ○ | ○ | ○ |
| Example 9 | $2 \times 10^8$ | ○ | ○ | ○ | ○ | ○ |
| Compara. Example 4 | $2 \times 10^7$ | ○ | ○ | ○ | X | — |
| Compara. Example 5 | $1 \times 10^9$ | ○ | X | X | ○ | X |

What is claimed is:

1. A thermal ink transfer printing material comprising a biaxially oriented polyester film, a coating layer on one surface of the polyester film and a heat-melting or heat-sublimating transfer ink layer on the other surface of the polyester film, which is produced by the steps of:
   - applying an aqueous coating liquid containing a water-soluble or water-dispersible polyolefin and a hydrophilic polymer to one surface of a polyester film,
   - stretching and drying the film to obtain a biaxially oriented polyester film having the coating layer on one surface thereof, and
   - providing the heat-melting or heat-sublimating transfer ink layer on the other surface of the biaxially oriented polyester film.

2. A thermal ink transfer printing material according to claim 1, wherein said coating liquid further contains carbon black having an average particle diameter in the range of 0.01 to 0.2 μm.

3. A thermal ink transfer printing material according to claim 1, wherein said water-soluble or water-dispersible polyolefin is a homopolymer or copolymer of a 1-olefin, or a complete or partial saponified product thereof.

4. A thermal ink transfer printing material according to claim 1, wherein said hydrophilic polymer is selected from the group consisting of cellulose derivatives, alginic acid, gum arabic, gelatin, sodium polyacrylate, polyacrylamide, polyvinyl alcohol, polyethylene oxide, polyvinylpyrrolidone, urethanes, acrylic resins, ether resins, epoxy resins and polyesters.

5. A thermal ink transfer printing material according to claim 1, wherein the content of said water-soluble or water-dispersible polyolefin in the coating layer is from 5 to 40 wt % based on the amount of the coating layer.

6. A thermal ink transfer printing material according to claim 1, wherein the content of said hydrophilic polymer in the coating layer is from 10 to 95 wt % based on the amount of the coating layer.

7. A thermal ink transfer printing material according to claim 1, wherein said water-soluble or water-dispersible polyolefin is selected from the group consisting of a copolymer of a 1-olefin and a conjugated or non-conjugated diene, (ii) a copolymer of a 1-olefin and vinyl acetate and (iii) a graft copolymer obtained by graft polymerizing a conjugated or non-conjugated diene or vinyl acetate to a 1-olefin homopolymer or copolymer.

* * * * *